July 24, 1962 S. GYNT 3,046,426
ROTOR SPIDER FOR ELECTRICAL MACHINES
Filed March 5, 1959
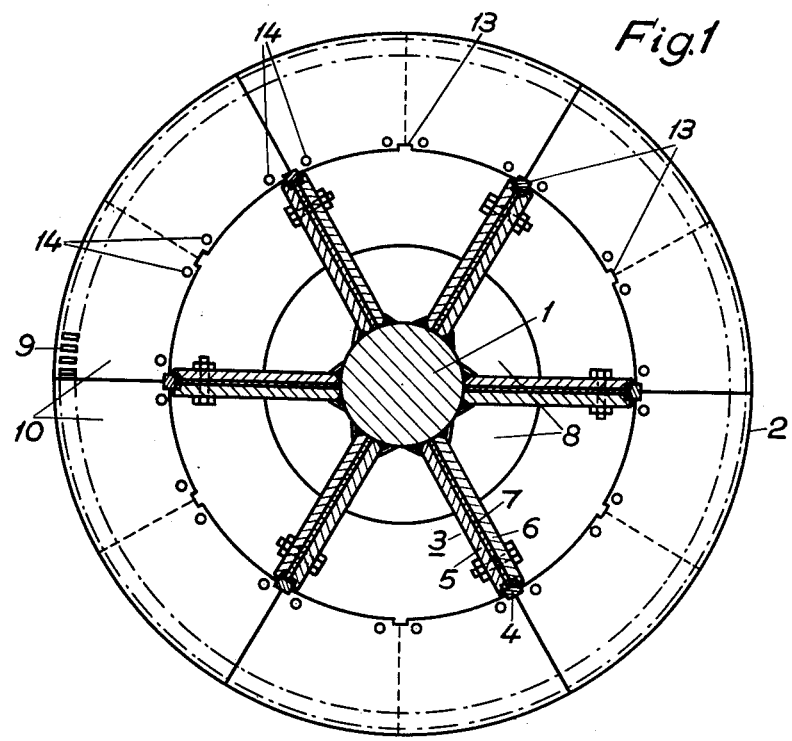
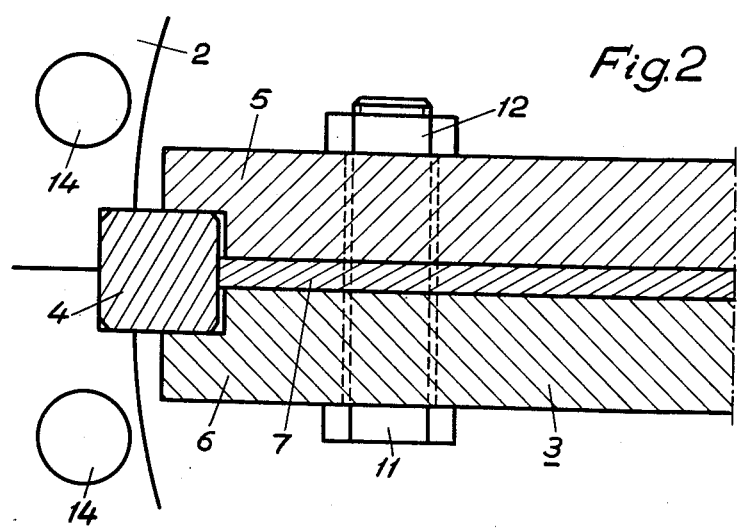
INVENTOR.
Sven Gynt
BY
Attorney.

3,046,426
ROTOR SPIDER FOR ELECTRICAL MACHINES

Sven Gynt, Vasteras, Sweden, assignor to Allmanna Svenska Elektriska Aktiebolaget, Vasteras, Sweden, a corporation of Sweden
Filed Mar. 5, 1959, Ser. No. 797,484
Claims priority, application Sweden Mar. 12, 1958
6 Claims. (Cl. 310—267)

This invention relates to the design of rotor spiders for electrical machines.

A ring of magnetic iron sheets built up from segments is usually employed in the construction of rotors with slot windings, the ring being shrunk onto a rotor body with arms. These arms must carry the ring with the windings and must, in addition to this, take up the turning moment so that, for machines with a big turning moment, these arms can become very stiff. It is furthermore a condition that the ring shall be fixed to the rotor spider by shrinking because all other fixing devices such as bolts, wedges, etc. must always be made with a certain tolerance and would, therefore, when a pulsating load is present, permit movements between the rotor spider and the ring, with consequent damages. It is furthermore desirable that the arms shall have a certain elasticity in the radial direction because the rotor ring will, under running conditions, get a greater diameter than the rotor spider, due to the centrifugal forces and the higher temperature than in the spider.

It has hitherto been very difficult to build machines with a slot-wound rotor for ratings over 7,500 kw. This is because if the arms are dimensioned so that they have the elasticity for the radial shrinking force then the arms will be too weak for bending. If the arms are dimensioned for the moment they shall transmit then they will be too stiff in the radial direction, which causes the rotor ring, by shrinking onto the rotor spider, to be too highly stressed and become uncircular, especially if the number of arms is small. It has been tried to prevent deformation by utilising a great number of arms in the rotor spider. This has, however, an additional drawback in that the segments which constitute the rotor ring and which are fixed by means of friction between each other, can then be displaced in the peripheral direction in relation to each other, which increases the diameter of the rotor ring.

The above mentioned drawbacks are avoided by the invention, which is characterised in that the radial arms of the rotor spider consist of two elements, of which one element is inserted between the outer ring of the rotor and the central rotor body for taking up the radial shrinking forces and the turning forces which develop between the ring and the body, and the other element is attached to the body, supports the first element and takes up the turning forces from this.

The invention will be described in the following with reference to the accompanying drawing, in which FIGURE 1 shows in end projection and in section a rotor for an electrical machine according to the invention and FIGURE 2 shows in detail the outer part of a rotor arm as shown in FIGURE 1.

In the FIGURES 1 and 2, 1 denotes a rotor shaft with rotor arms 3 fixed to this, these consisting of two sheets 5 and 6 which are welded to the shaft with a loosely placed sheet 7 between them. 8 denotes sector-formed plates, the purpose of these being to stiffen the arms 3. 2 denotes a ring built up from segment sheets, these being fitted with stampings 13 and 9 for holding wedges 4 and windings respectively. The plate sections 10 are also equipped with holes 14 in which rods are inserted mainly to facilitate the stacking of the plates. 11 denotes a bolt with a nut 12 for securing the parts 5 and 6 of the arms. The plate 7 is fitted with a hole of such a size that the bolt will not prevent radial movements of the plate 7 between the plates 5 and 6. The wedge 4 and the plate 7 are so dimensioned that they will be pressed against each other by the shrinking forces. The friction between the wedges 4 and the end of the plates 7 is sufficient under ordinary conditions to transmit turning movement between the ring and the central body. The plates 5 and 6 are so designed that they will not engage the wedge 4 in the radial direction, and therefore will not resist radial shrinkage forces, these being exerted solely on the plates 7. However, the plates 5 and 6 engage the side faces of the wedge 4 to prevent any possible movement between the plates 7 and the wedges if large, abnormal loads develop which exceed the loads which can be taken up by the friction between plates 7 and wedges 4.

The embodiment shown in the drawing of a rotor according to the invention is only intended to illustrate the principle of the invention and many different designs are possible within the scope of the invention. The plates which constitute the rotor arms can, for example, be replaced by concentrically fitted bodies mounted perpendicularly to the shaft without, in principle, any difference occurring.

I claim:

1. Rotor spider for electrical machines comprising a central body, arms extending radially outward from said central body, and a ring of magnetic material shrunk onto said radial arms, the said arms each comprising at least one first element mounted between said ring and body and extending the full radial distance therebetween to absorb the shrinking forces and at least one second element engaged with and supporting said first element and fixed to said central body but spaced radially at its outer end from said ring, the said elements having means thereon operatively engaging the ring for transmitting turning moment between said ring and said central body.

2. Rotor spider according to claim 1, in which said first elements are sheets of relatively low stiffness to bending.

3. Rotor spider according to claim 1, in which said second elements are sheets of relatively high stiffness to bending.

4. Rotor spider according to claim 1, in which said first elements are sheets of relatively low stiffness to bending and said second elements are sheets of relatively high stiffness to bending, each arm including two second elements, each of said first elements lying between and in contact with and being supported laterally by said two second elements, said ring having slots in its innerwall, and keys positioned in said slots and abutting the outer ends of said first elements, said second elements partially laterally overlapping said keys.

5. Rotor spider for electrical machines comprising a central body, arms extending radially outward from said central body, and a ring of magnetic material shrunk onto said radial arms, the said arms each comprising at least one first and at least one second element, said first element consisting of a sheet of relatively low stiffness to bending and mounted between said ring and body and extending the full radial distance therebetween to absorb the shrinking forces, and said second element consisting of a sheet of relatively high stiffness to bending, being fixed to said central body but spaced radially at its outer end from said ring and supporting said first element in the tangential direction only, said elements having means thereon operatively engaging the ring for transmitting turning movement between the ring and the central body.

6. Rotor spider for electrical machines comprising a central body, arms extending radially outward from said central body, and a ring of magnetic material shrunk onto said radial arms, the said arms each comprising one first element and two second elements, said first element consisting of a sheet of relatively low stiffness to bending and mounted between said ring and body and extending the full radial distance therebetween to absorb the shrinking forces, said second elements consisting of sheets of relatively high stiffness to bending, supporting said first element and being fixed to said central body but spaced radially at its outer end from said ring, each of said first elements lying between and in contact with and being supported laterally by said two second elements, said ring having slots in its inner wall, and keys positioned in said slots and abutting the outer ends of said first element.

References Cited in the file of this patent

UNITED STATES PATENTS

| | | |
|---|---|---|
| 387,343 | Crompton | Aug. 7, 1888 |
| 504,401 | Morrow | Sept. 5, 1893 |
| 789,454 | Reist | May 9, 1905 |
| 1,158,463 | Eaton | Nov. 2, 1915 |
| 1,279,591 | Sammarone | Sept. 24, 1918 |